United States Patent
Horii

(10) Patent No.: US 6,755,560 B2
(45) Date of Patent: Jun. 29, 2004

(54) VEHICLE HEADLAMP OPTICAL AXIS CONTROL SYSTEM

(75) Inventor: Yasutoshi Horii, Nagoya (JP)

(73) Assignee: Denso Corporation, Kariya (JP)

( * ) Notice: Subject to any disclaimer, the term of this patent is extended or adjusted under 35 U.S.C. 154(b) by 63 days.

(21) Appl. No.: 10/216,850

(22) Filed: Aug. 13, 2002

(65) Prior Publication Data

US 2003/0043588 A1 Mar. 6, 2003

(30) Foreign Application Priority Data

Aug. 31, 2001 (JP) ........................................ 2001-263067

(51) Int. Cl.[7] ................................................ B60Q 1/12
(52) U.S. Cl. ........................ 362/466; 362/465; 362/276; 315/82
(58) Field of Search .............................. 362/466, 465, 362/464, 460, 37, 40, 41, 43, 276, 428, 53, 467; 315/82, 79, 81

(56) References Cited

U.S. PATENT DOCUMENTS

| 5,588,733 | A | * | 12/1996 | Gotou | .................... | 362/37 |
| 6,049,749 | A | | 4/2000 | Kobayashi | .................... | 701/49 |
| 6,193,398 | B1 | * | 2/2001 | Okuchi et al. | .............. | 362/466 |
| 6,578,993 | B2 | * | 6/2003 | Kobayashi et al. | ......... | 362/466 |
| 6,626,563 | B2 | * | 9/2003 | Nishimura et al. | ......... | 362/465 |
| 6,626,564 | B2 | * | 9/2003 | Horii et al. | ................. | 362/466 |

* cited by examiner

Primary Examiner—Stephen Husar
Assistant Examiner—Bao Q. Truong
(74) Attorney, Agent, or Firm—Posz & Bethards, PLC

(57) ABSTRACT

A head lamp's optical axis control system for a vehicle includes a vehicle speed sensor, steering angle sensor, a navigator, an actuator for swiveling the optical axis, a first control circuit for controlling the actuator to swivel the optical axis according to the vehicle speed signal and the steering angle thereby providing a first illumination range and a second control circuit for controlling the actuator to swivel the optical axis according to the vehicle speed and the front road-shape presented by the navigator thereby providing a second illumination range. If it is judged that the front road-shape is not covered by the first illumination range beforehand, the second control circuit controls the actuator to cover the road-shape by the second illumination range.

5 Claims, 3 Drawing Sheets

VEHICLE HEADLAMP OPTICAL AXIS CONTROL SYSTEM

CROSS REFERENCE TO RELATED APPLICATION

The present application is based on and claims priority from Japanese Patent Application 2001-263067, filed Aug. 31, 2001, the contents of which are incorporated herein by reference.

BACKGROUND OF THE INVENTION

1. Field of the Invention

The present invention relates to a headlamp's optical axis control system for a vehicle.

2. Description of the Related Art

In a known headlamp's optical axis control system, the headlamp's optical axis is controlled to swivel right or left according to the steering angle of a steering wheel. The illumination range of the headlamps is controlled after a driver steers the steering wheel. Therefore, the illumination range of the headlamps may not sufficiently cover an area necessary to observe in front of the vehicle when a vehicle is going to pass a curve.

SUMMARY OF THE INVENTION

The present invention has been made in view of the above-stated problem.

It is an object of the invention to provide a vehicle headlamp's optical axis control system that can swivel the headlamp's optical axis before a driver steers the steering wheel so that the illumination range of the headlamps can sufficiently cover an area necessary to observe in front of the vehicle when a vehicle is going to pass a curve.

According to a feature of the invention a head lamp's optical axis control system for a vehicle includes vehicle speed sensor, a steering angle sensor, a navigation system for presenting a road-shape in front of the vehicle, an actuator for swiveling the optical axis of the head lamps, first control means for controlling the actuator to swivel the optical axis according to the vehicle speed signal and the steering angle signal, thereby providing a first illumination range; and second control means for controlling the actuator to swivel the optical axis according to the vehicle speed and the front road-shape presented by the navigation system thereby providing a second illumination range before the steering angle detecting means detects the steering angle if the front road-shape is judged not covered by the first illumination range. Preferably, the second control means provides a turning radius of the vehicle according to the road-shape data. The second control means calculates the turning radius by setting a plurality of points on the curved road through which the vehicle is going to pass. In such a case, the second control means may restore the optical axis to provide the first illumination range if the steering angle is not detected after a preset time passes.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
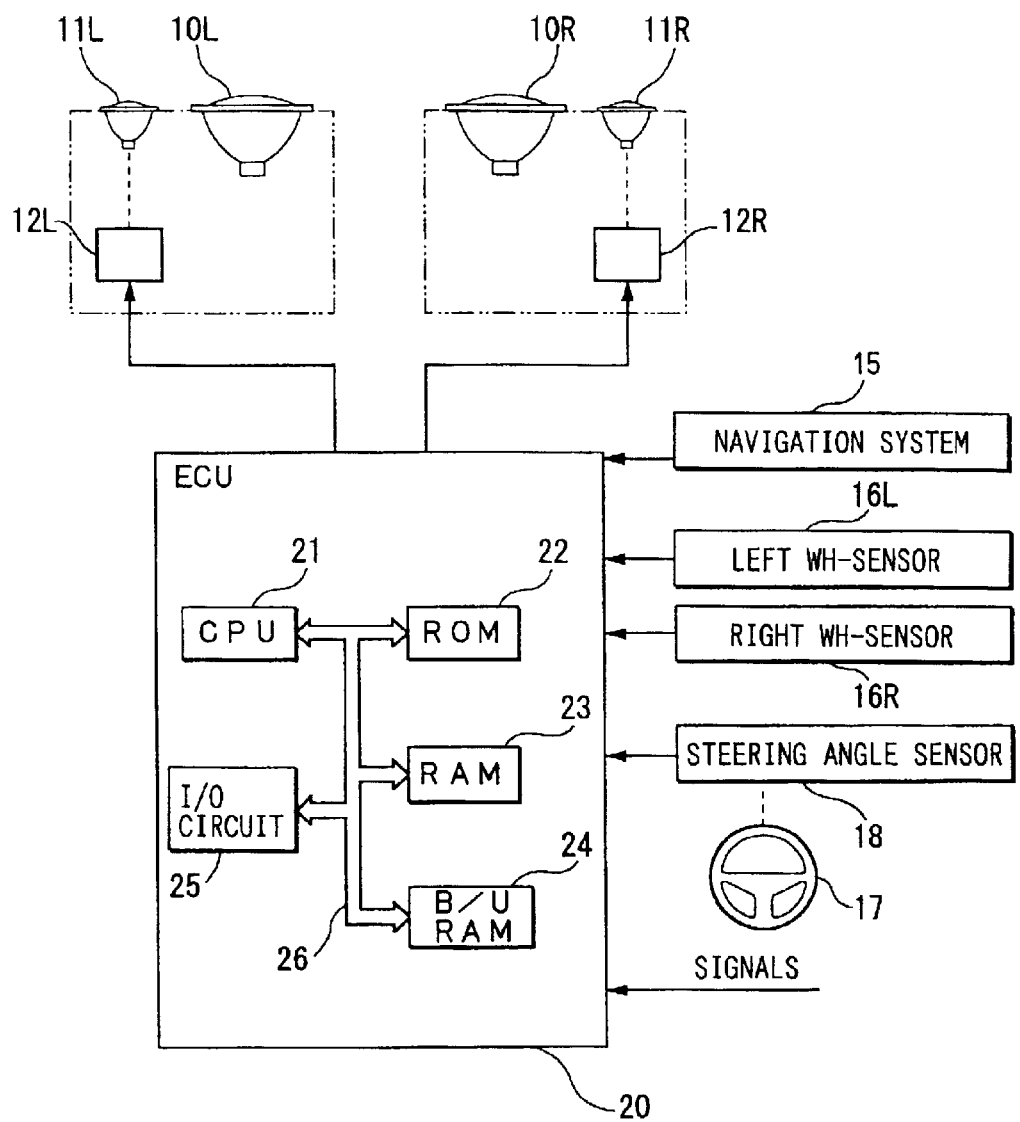
FIG. 1 is a schematic diagram illustrating a vehicle headlamp's optical axis control system according to a preferred embodiment of the invention.

As shown in FIG. 1, a vehicle is equipped with right and left headlamps 10R, 10L, right and left swiveling lamps 11R, 11L, their swiveling actuators 12R, 12L, a navigation system 15, right and left wheel speed sensors 16R, 16L, a steering wheel 17, a steering angle sensor 18 and an electronic control unit (ECU) 20.

The steering angle sensor 18 detects steering angle θs of the steering wheel 17 shifted from the neutral position thereof. The ECU 20 includes a central processor unit (CPU) 21, a ROM 22, a RAM 23, a back-up RAM 24, I/O circuit 25, bus lines 26, etc. The ECU 20 connects with the navigation system 15, the wheel speed sensors 16R, 16L, and the steering angle sensor 18.

Figure 2:
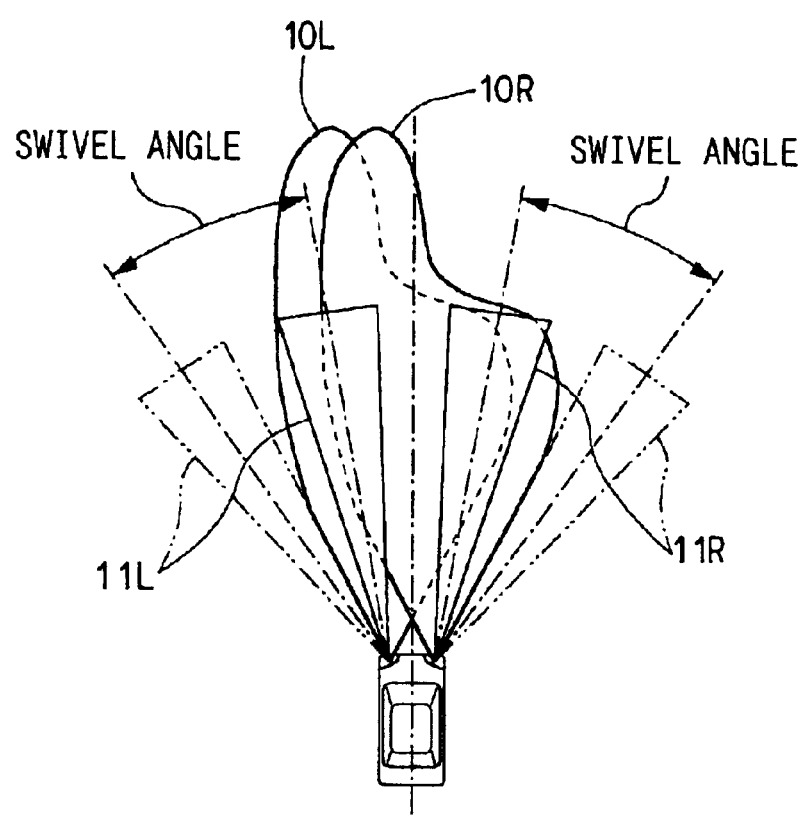
FIG. 2 is an illumination range formed by vehicle headlamps and swiveling lamps that are controlled by the headlamp's optical axis control system according to the preferred embodiment of the invention.

The ECU 20 sends control signals to the swiveling actuators 12R, 12L to control the optical axis of the swiveling lamps 11R, 11L, as shown in FIG. 2. The illumination ranges of the right and left headlamps 10R, 10L (in the low beam state) are fixed, while the swiveling lamps 11R, 11L are movable so that they are controlled to swivel right and left. The headlamps 10R, 10L can be modified to be controlled to swivel instead of the swiveling lamps 11R, 11L.

Figure 3:
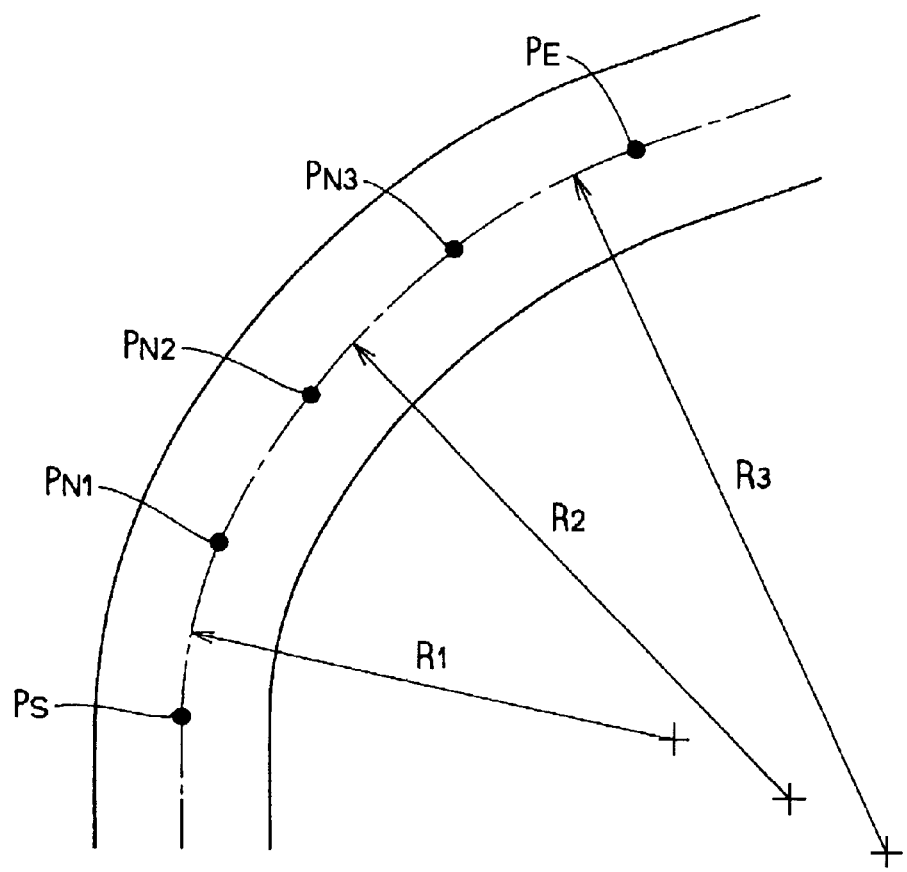
FIG. 3 is a schematic diagram illustrating an idea of calculating a turning radius of a vehicle that is going to turn a curve.

The ECU 20 regularly reads a road-shape of the road in front of the vehicle from the navigation system 15. When the ECU 20 judges the road-shape a right-turn curve, its starting point PS, ending point PE and nodes PN1–PN3 are set to calculate three successive turning radiuses R1, R2, R3, as shown in FIG. 3.

When the vehicle comes in front of the right-turn curve, a target swivel angle of the optical axis of the right swiveling lamp 11R is calculated from the turning radiuses R1, R2, R3 and a vehicle speed.

The ECU 20 examines whether the target swiveling angle is within an ordinary angle that can be controlled according to the steering angle θs or not.

If the target angle is within the ordinary angle, the ECU 20 sends control signals to the swiveling actuators 12R, 12L to control the optical axis of the swiveling lamps 11R, 11L, according to the steering angle θs and the vehicle speed.

If the target angle is not within the ordinary angle, the ECU 20 sends a signal to the swiveling actuators 12R, 12L to set the optical axis of the swiveling lamp at the target angle before the steering angle θs of the steering wheel 17 is detected. However, the optical axes of the swiveling lamps are turned back or the swiveling lamps are turned off if the steering angle θs of the steering wheel 17 is not detected after a preset time passes, assuming that the data of the navigation system 15 is in error.

Figure 4:
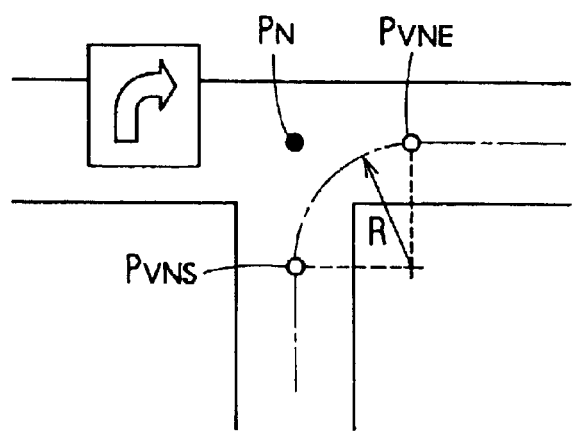
FIG. 4 is a schematic diagram illustrating an idea of calculating a turning radius of the vehicle that is going to turn a corner of a T-shaped road.

When the vehicle is going to turn right to pass a T-shaped junction as shown in FIG. 4, the ECU 20 reads the road-shape of the junction from the navigation system 15. In this case, the ECU 20 sets only one node PN at the center of the junction, which does not fix the turning radius of the right-turn curve. The ECU 20 provides hypothetical nodes PVNS, PVNE that correspond respectively to the starting point and the ending point to calculate the turning radius R. Therefore, the optical axis of the swiveling lamp can be changed before the steering angle θs of the steering wheel 17 is detected.

Thus, the ECU 20 reads the road-shape of the road in front of the vehicle from the navigation system before the steering wheel is turned so as to swivel the optical axes of the swiveling lamps 11R, 11L if the vehicle is going to turn a steep curve or a junction such as a T-shaped junction. As a result, the illumination range of the swiveling lamps can surely cover an object on the road in front of the vehicle.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A lamp's optical axis control system for a vehicle having a lamp with an optical axis for illuminating a illumination range in front of the vehicle, said control system comprising:

vehicle speed detecting means for providing a vehicle speed signal;

steering angle detecting means for providing a steering angle signal of a steering wheel;

front road-shape presenting means for presenting a road-shape in front of the vehicle;

an actuator for swiveling said optical axis; and control means for controlling said actuator to swivel said optical axis according to the vehicle speed signal and the steering angle signal, thereby providing a first illumination range, wherein the control means includes judging means for judging whether the road-shape presented by said front road-shape presenting means is covered by the first illumination range or not, and wherein the control means controls said actuator to swivel said optical axis according to the vehicle speed signal and the front road-shape thereby providing a second illumination range before said steering angle detecting means detects the steering angle if said judging means judges that the front road-shape is not covered by the first illumination range.

2. The lamp's optical axis control system as claimed in claim 1, wherein said control means provides a turning radius of the vehicle according to the road-shape data.

3. The lamp's optical axis control system as claimed in claim 1, wherein said control means calculates the turning radius by setting a plurality of points on said curved road through which the vehicle is going to pass.

4. The lamp's optical axis control system as claimed in claim 1, wherein said control means restores said optical axis to provide the first illumination range if the steering angle is not detected after a preset time passes.

5. A lamp's optical axis control system for a vehicle having a lamp having an optical axis for illuminating a illumination range in front of the vehicle, said control system comprising:

vehicle speed detecting means for providing a vehicle speed signal;

steering angle detecting means for providing a steering angle signal of a steering wheel;

front road-shape presenting means for presenting a turning radius of the vehicle before said steering angle detecting means provides said steering signal;

an actuator for swiveling said optical axis; and control means for controlling said actuator to swivel said optical axis according to the vehicle speed signal and the steering angle signal, thereby providing a first illumination range, wherein:

the control means controls said actuator to swivel said optical axis according to the vehicle speed signal and the front road-shape thereby providing a second illumination range before said steering angle detecting means detects the steering angle; and said control means changes said optical axis to provide the first illumination range if the steering angle detecting means does not detect a steering angel that corresponds to the turning radius presented by said front road-shape presenting means after a preset time passes.

* * * * *